Patented July 25, 1950

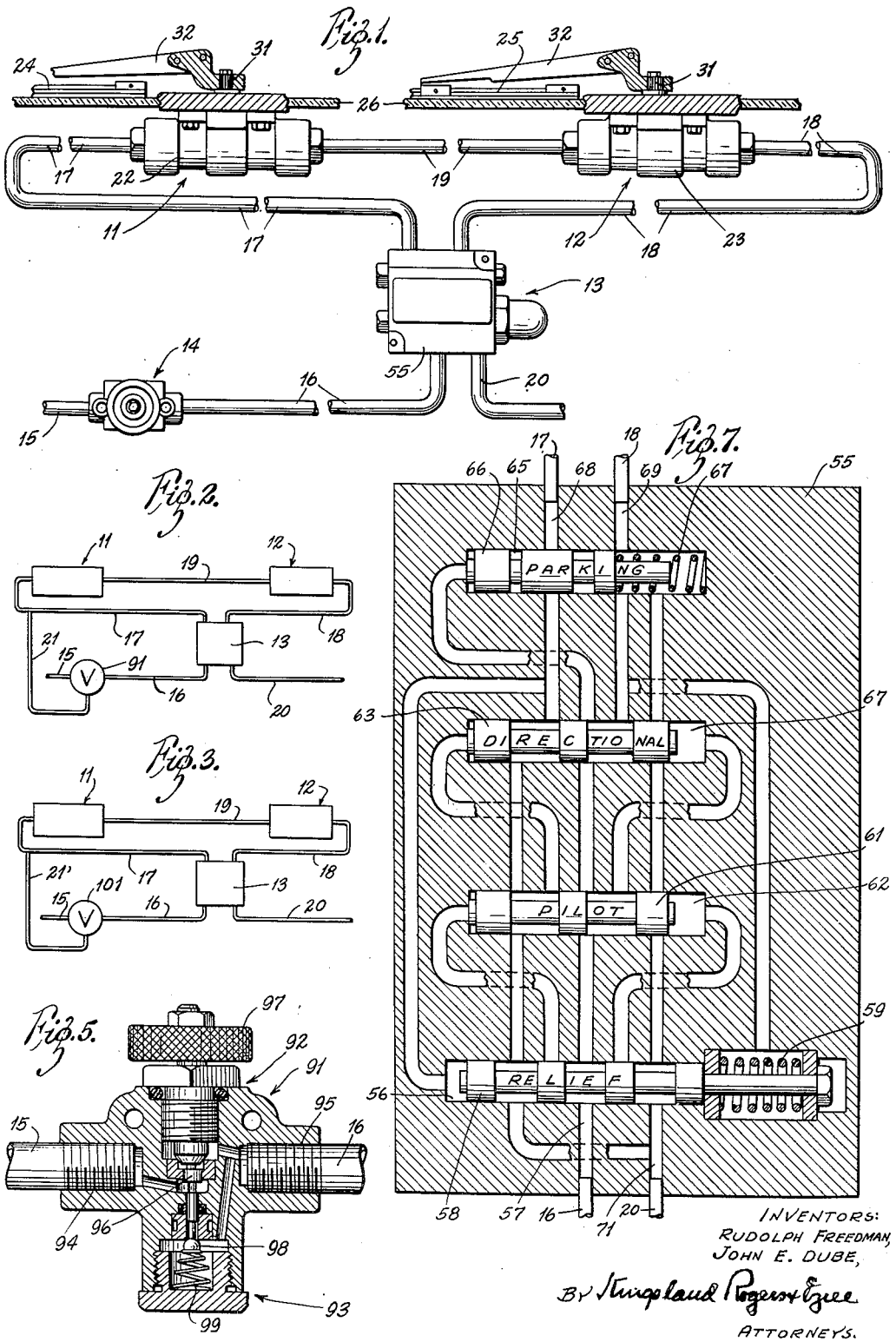
July 25, 1950     R. FREEDMAN ET AL     2,516,558
WINDSHIELD WIPER SYSTEM
Filed Oct. 4, 1945     2 Sheets-Sheet 1
INVENTORS:
RUDOLPH FREEDMAN,
JOHN E. DUBE,
By Kingsland Rogers & Ezell
ATTORNEYS.

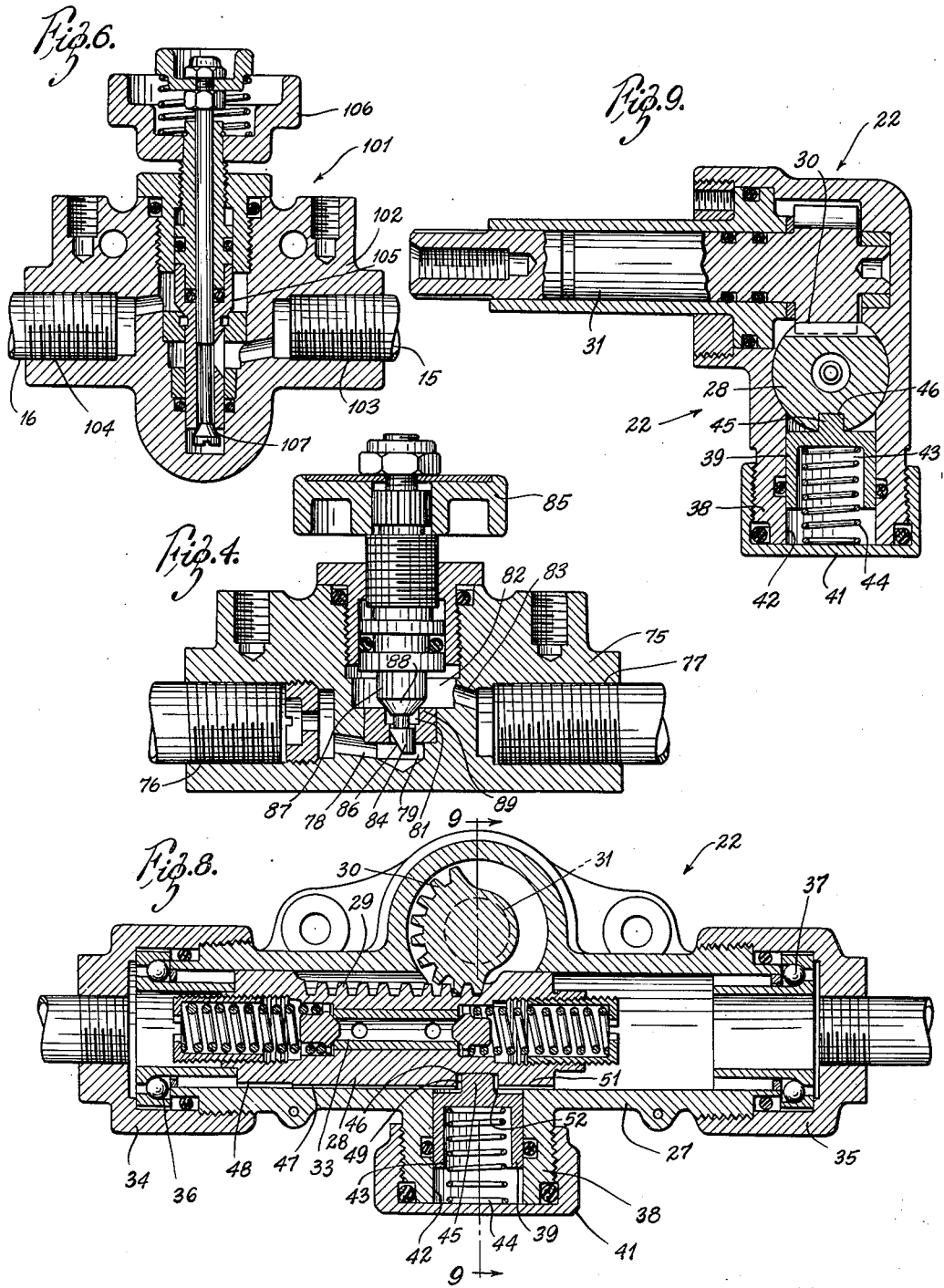

2,516,558

UNITED STATES PATENT OFFICE 2,516,558

WINDSHIELD WIPER SYSTEM

Rudolph Freedman, University City, and John E. Dube, Chesterfield, Mo., assignors, by mesne assignments, to Kearfott Company, Inc., New York, N. Y., a corporation of New York Application October 4, 1945, Serial No. 620,318

23 Claims. (Cl. 15—253)

This invention pertains to hydraulic windshield wiper systems generally, and concerns itself more particularly with a system providing for positive locking of its wiper blades in a selected position automatically.

It is a general aim of the invention to provide a wiper unit having means automatically operable for positively locking its wiper blades in a selected position when the system is brought to rest.

It is also an object of the invention to provide a fluid operated windshield wiper system in which the blades of its wiper units are moved to a selected position through the manipulation of a simple metering valve and, subsequently, positively locked in this position by automatically operable means.

It is another object of the invention to provide a fluid operated windshield wiper system in which the blades of its wiper units are moved to a selected position automatically upon the manipulation of a metering valve and are thereafter locked in this position positively by automatically operable means.

A further object of the invention is to provide a fluid operated windshield wiper system in which the blades of its wiper units are moved to a selected position semiautomatically after the closure of a metering valve and thereafter locked in this position positively by automatically operable means.

Yet another object of the invention is to provide a fluid operated windshield wiper unit, having a double-acting piston movable to operate a wiper blade, which has a biased member movable into engagement with the piston to lock the same in a selected position when pressure is removed from the piston and out of engagement therewith when pressure is acting on the piston.

Other objects and advantages will become apparent as the description proceeds, and a more comprehensive understanding of the invention will be afforded from the following detailed description when considered in conjunction with the accompanying drawings, in which:

Fig. 1 is a plan view of a fluid operated windshield wiper system illustrating an embodiment of the invention;

Figs. 2 and 3 are diagrammatic showings of the invention illustrating it in modified form;

Figs. 4, 5 and 6 are vertical sectional views of speed control valves employed in the systems illustrated in Figs. 1, 2 and 3, respectively;

Fig. 7 is a diagrammatic illustration of a control unit employed in the systems shown in Figs. 1 to 3, inclusive; and Figs. 8 and 9 are vertical sectional views of a wiper unit employed in the systems illustrating the various embodiments of the invention, Fig. 9 being taken along the line 9—9 of Fig. 8.

In carrying out the invention in the embodiment illustrated in Fig. 1, a pair of wiper units 11 and 12 is connected to be controlled by a control unit 13, which, in turn, is supplied high pressure fluid through a speed control valve 14. Fluid under pressure is admitted to the speed control valve 14 through a line 15 where it is metered for transmission through a line 16 to the control unit 13. From the latter device, a line 17 supplies fluid to the wiper unit 11, and a line 18 to the wiper unit 12. Both units are interconnected by a line 19 which transmits fluid therebetween, and fluid from each of the units is exhausted through the control unit 13 into a line 20 which returns it to a reservoir (not shown).

In this particular embodiment of the invention, fluid under pressure is directed by the control unit 13 to the hydraulic motors 22 and 23 of the wiper units 11 and 12, respectively, in a manner such that their wiper blades 24 and 25 are moved back and forth across sector areas of the windshield 26 to maintain the same clear of the elements and provide clear visibility through the windshield.

The hydraulic motors 22 and 23, which are employed in the system under discussion, are identical and, accordingly, only the motor 22 will be described. This description will also suffice for the embodiments of the invention illustrated in Figs. 2 and 3 since the wiper units of these systems are identical with that now to be described.

As illustrated in Figs. 8 and 9, this motor contemplates the use of a mechanical locking means operable to lock the motor's piston in a fixed position, which, in turn, locks the wiping blade, which it drives, in a preselected position. This improved motor involves novel features, which permit the locking piston, without resort to return lines, to operate in conjunction with a parking valve within the control unit 13, and makes possible a wide selection of system operation providing for parking and locking of the wiper unit blades. The motor comprises a cylinder 27 in which a double-acting piston 28 is reciprocated by the action of fluid under pressure. The piston 28 is provided with a rack portion 29 which forms a part of its external surface and meshes with a pinion 30 fixed to a splined shaft 31 on which a windshield wiper arm 32 is carried. Located within the piston 28 is a double-acting relief valve 33 which is operative to pass fluid around the piston. The unit also has within its end connections 34 and 35 a pair of dashpot check valves 36 and 37. Fluid is supplied to the motor through the line 17 threaded into the end connection 34 and the line 19 threaded into the end connection 35.

For the purpose of retaining the locking device for the motor, a boss 38 is formed on the casing 27. A locking piston 39 is movably retained within a cap 41 which is screwed onto the boss 38 to form a closure for the same. The boss 38 is internally bored to form a cylinder 42 in which the piston 39 is operable. The latter element is recessed at 43 to form a retainer for a compression spring 44 which seats against an internal face of the cap 41 and biases the locking piston 39 in a manner such as to move a lug 45 forming an end part thereof into engagement within a groove 46 channeled in the piston 28. The piston 28 is also undercut to form a passageway 47 communicating with a notch 48 through which fluid under pressure is transmitted to a chamber 49 above the locking piston 39. A similar groove 51 permits the flow of fluid from the opposite end of the piston into a chamber 52 also above a portion of the locking piston 39. Under the influence of fluid pressure admitted to either of the lines 17 or 19, the piston 39 is moved against the forces of the spring 44 to move the same downwardly and remove the lug 45 from the notch 46 in the piston 28. Conversely, when fluid pressure is released, the spring 44 is operative to bias the locking piston upwardly so that the lug 45 is moved into engagement with the piston 28 to provide a positive mechanical lock for the piston in this position.

The control unit which directs the flow of fluid to both of the hydraulic motors 22 and 23 in a manner to reciprocate the wiper blades 24 and 25 thereof comprises a valve body 55 in which there is channeled a plurality of conduits interconnecting four valve cavities containing a similar number of hydraulically operated valves. By fluid received through the line 16, three of these valves are manipulated to alternately apply pressures to the motors 22 and 23, the said fluid being exhausted from the motor not receiving high pressure fluid through the control unit 13 and the line 20 back to storage.

High pressure fluid, which is admitted through the line 16, is transmitted to a valve cavity 56 by means of a conduit 57 connecting with the line 16. Within the valve cavity 56, a sliding valve 58 is operative. This valve, termed a double-acting relief valve, is biased into neutral position by a spring 59 but is otherwise hydraulically operated. The valve 58, in turn, controls a second sliding valve 61 known as a pilot valve. This valve is entirely pressure operated and functions in a valve cavity 62. A third sliding valve, described as a directional valve, 63 moves within a valve cavity 64 and controls the flow of high pressure fluid to either of the lines 17 or 18, depending upon which motor is to receive it. Within a fourth valve cavity 65, a parking valve 66 is movable under the forces of a spring 67 in one instance and fluid pressure in another instance. The valve is biased to its extreme left hand position by means of the spring 67. It operates in conjunction with one of several speed control valves and the aforedescribed hydraulic motor to give to the systems embodying the invention a combination of wiper blade, parking and locking operations.

The lines 17 and 18 are connected with the valve cavity 65 by two conduits 68 and 69, respectively, and the exhaust line 20 communicates with the valve cavity 56 by means of a conduit 71. Each of the valve cavities has interconnecting conduits, and each of the various valves has reduced sections which permit a flow of fluid around that valve. The points of entry of the various conduits into the valve cavities form ports which are opened and closed depending on the particular section of the valve moved over them. Conduits are also provided to apply pressure to the end sections of the various valves to effect their movement in their respective cavities.

In the system illustrated in Fig. 1, the speed control valve 14 performs a single function, namely, that of metering fluid to the control unit 13 for the purpose of governing the speed at which the wiper blades of the wiper units are driven. This speed control valve is illustrated in Fig. 4 and comprises a valve body 75 having an inlet opening 76 and an outlet opening 77 into which the lines 15 and 16, respectively, are connected. The inlet opening 76 is connected with the outlet opening 77 through a series of passageways comprising a port 78, a chamber 79, a valve cavity 81, a chamber 82 and a port 83. Controlling the flow of fluid from the inlet to the outlet opening is a metering valve 84 which is moved by means of the thumb wheel 85. The metering valve 84 is channeled with an oblique groove 86 which presents an orifice of increased cross section upon opening of the valve to supply a variable flow of fluid. The stem 87, on which the valve 84 is carried, is formed with an oblique surface 88 which seats against a portion of the valve body 89 to close the passageway between the inlet and outlet openings of the valve.

*Second modification*

In a second modification of the invention, as is illustrated in Fig. 2, a pair of wiping units 11 and 12 are employed, which are identical with those previously described. Likewise, a control unit 13 is similarly employed. The lines 15, 16, 17, 18, 19 and 20 are also connected in the system, as illustrated in Fig. 1. Here, however, a speed control valve 91, taking the form illustrated in Fig. 5, is connected in the system between the lines 15 and 16. This speed control valve, in addition to performing the function of metering a flow of fluid from the high pressure line 15 to the control unit 13, is also operative to automatically pass fluid under pressure around the control unit 13 into the system in a manner such as to automatically park the wiper blades 24 and 25 in a selected position where they are subsequently locked by the locking mechanism of their driving motors. This particular speed control valve, as will be more fully described, is provided with a parking outlet port to which a line 21, feeding into the line 17, is connected. It comprises a valve body in which a metering valve assembly 92 and a parking valve assembly 93 are operative. Briefly, the valve is provided with an inlet opening 94 and an outlet opening 95 into which the lines 15 and 16 are connected. These openings are interconnected by a series of chambers and passageways, and fluid is transmitted between these openings under the control of a metering valve 96 forming part of the metering valve assembly 92, which is operated by means of a thumb wheel 97 together with associated apparatus. Connecting with the downstream side of the metering valve is a parking port (not shown) into which the line 21 is connected. From the outlet side of the metering valve, fluid is fed into the line 21 under the control of a ball valve 98, termed a parking valve. This valve is biased against its seat by means of a spring 99 and is maintained in its closed position by this spring. The valve is opened by the downward movement of the metering valve 96 as the same is moved to its closed position by means of the thumb wheel 97 and is opened at a predetermined point of movement of said valve. Thus, and as will be described more fully in connection with the system's operation, fluid is bypassed from the downstream side of the metering valve 96 into the line 17 upon the opening of the parking valve 98.

Third modification

Here, as in the second modification, the wiper units 11 and 12, the control unit 13, and the lines 15, 16, 17, 18, 19 and 20 are connected as illustrated in Fig. 1. A parking valve 101, such as that illustrated in Fig. 6, is connected in the system between the lines 15 and 16, and, as for the parking valve 91 in the system illustrated in Fig. 2, this valve is provided with a parking outlet port which connects with a line 21' feeding into the line 17. As in the previously described modification, the speed control valve 101 is operative to move the wiper blades of the system's wiper units to a selected parked position. This valve provides means for semiautomatically parking the wiper blades. It comprises a valve body 102 in which an inlet opening 103 and an outlet opening 104 are formed to receive the lines 15 and 16, respectively. The inlet opening 103 and the outlet opening 104 are interconnected by a series of ports and passages, and the flow of fluid from the first to the second is controlled by a metering valve 105 which is opened and closed by means of a thumb wheel 106. Likewise, the inlet opening 103 is in communication with a parking outlet (not shown) through a passageway comprising various ports and channels, as illustrated, around a metering valve 107 which is balanced and is operated by depressing a thumb button 108. By means of this valve, high pressure fluid, which is impressed upon the system through the line 15, is metered by the metering valve 105 for speed control. Insofar as the valve 105 is concerned, the operation of the parking valve 101 is, for all practical purposes, identical with that illustrated in Fig. 4. However, by manipulation of the parking valve 107, high pressure fluid from the inlet opening 103 is transmitted by means of the parking outlet opening (not shown) into the line 21' which feeds into the line 17 to effect semiautomatic parking of the wiper blades.

Operation

For the sake of brevity, the operation of the system, as illustrated in Fig. 1, will be described fully as embodying the operation of the control unit 13 and the wiper units 11 and 12; and, thereafter, the operation of the systems illustrated in Figs. 2 and 3, respectively, will be limited to a discussion of their overall operation as effected by their respective speed control valves 91 and 101.

In each instance, for the purpose of describing the system's operation, each will be assumed to have been stopped after previous use. In this condition, the wiper blades 24 and 25 will occupy a position, as illustrated in Fig. 1, and the entire system will be considered as having been filled with fluid and properly bled. Further, the various valves of the control unit will occupy the positions illustrated in Fig. 7. As a further aid to the description, quantitative fluid pressure values will be used, although it is expressly understood that the system is not limited to any particular operating pressures nor to any particular pressure-exerting medium.

Modification 1

When it is desired to place the system in operation, high pressure fluid is impressed upon it from a proper source through the line 15 and is admitted thereto by opening the metering valve 86 of the speed control valve 14. The opening of this valve is accomplished by turning the thumb wheel 85, and the amount of fluid which is admitted to the system depends upon the degree to which the metering valve 86 is opened. In this manner, the speed of the system is determined. From the speed control valve 14, metered fluid is transmitted through the line 16 into the control unit 13. With the relief valve 58, the pilot valve 61 and the directional valve 63 positioned as illustrated, the line 18 will be connected to the exhaust or low pressure line 20, and line 17 will be closed by the parking valve 66. When fluid is admitted to the control unit, however, the parking valve 66 will receive high pressure fluid on the left hand thereof, and the same will be moved to the right against the forces of the spring 67. This valve will be held in this position as long as pressure is acting on the control unit. When in its open position, the parking valve 66 will be moved so that both of the lines 17 and 18 are ported to receive fluid pressure under the control of the directional valve 66.

Once the parking valve has opened, fluid will be admitted to either of the lines 17 or 18, depending upon the positions of the various valves within the control unit 13. If these valves are positioned to port high pressure fluid into the line 17, the piston of the hydraulic motor 22 will be moved to its extreme right hand position, which will move the wiper blade to the position illustrated in Fig. 1. Since the double-acting relief valve 33 of the motor 22 is set to operate at approximately 250 pounds per square inch, the same will be operated to permit a flow of fluid around or through the piston 28 into the line 19 which will move the piston of the motor 23 to its extreme right hand position, thus moving the wiper blade 25 into the position illustrated. Since the setting of the relief valve in the hydraulic motor 23 is also 250 pounds per square inch, the combined pressure drop presented by these two valves in series will approximate 500 pounds per square inch, and pressure will develop in the line 17 to a value sufficient to reverse the relief valve 58 against the forces of its spring 59. Thereafter, the control unit 13 will be conditioned to port fluid into the line 18, which will reverse the operation of the hydraulic motors 22 and 23 to initiate another cycle, and the wiper blades 24 and 25 will be reciprocated as long as the metering valve 86 is open.

When it is desired to bring the system to a stop, the metering valve 86 is manipulated in a manner such as to move the pistons of the wiper units into their extreme left hand positions which will move the wiper blades 24 and 25 to a position opposite to that assumed by them in the figure. Such operation must be effected by slowly closing the metering valve while watching the position taken by the wiper blade. After it has reached the selected position, the metering valve 86 is then completely closed, which cuts off pressure from the system. As pressure is released from the control unit 13, the parking valve 66 thereof is biased to its extreme left hand position by the spring 67, and the line 17 connecting therewith is closed. The line 18, however, is connected through the control unit to the exhaust line 20 which permits the displacement of the locking piston 39 in each of the motors 22 and 23. In this manner, the wiper blades are moved by manually controlled means to a selected position and thereafter automatically locked.

Second embodiment

Insofar as the normal operation of this system is concerned, it is identical with that described for the embodiment of the invention illustrated in Fig. 1. That is to say, the system is placed in operation by opening the metering valve 96 of the speed control valve 91 to reciprocate the wiper blades of the wiper units. When it is desired to bring the system to rest, however, the mode of parking the blades is varied and thereafter the locking mechanism of the wiper units 11 and 12 functions the same as that previously described.

The system is brought to rest by closing the metering valve 96 of the speed control valve 91, and, at a predetermined point in the travel of its valve stem, the parking valve 98 is opened to bypass fluid from the outlet opening 95 of the speed control valve 91 into the line 21 where it is fed into the line 17. If, at this time, the control unit 13 is porting high pressure fluid into the line 17, sufficient pressure will be built up therein to cause a reversal of the double-acting relief valve 58 within the control unit 13. Fluid will then be directed from the pressure outlet of the metering valve 91 through the control unit 13 into the line 18 to cause the motors 23 and 24 to move the blades to the right. At this time, the control unit 13 has been conditioned to port the line 17 into the return line 20. Also, since the metering valve 96 is being closed further during this time, sufficient pressure is not available in the wiper line 18 to cause the control unit to effect another reversal of the wiper units. Hence, the wiper blades 24 and 25 remain in this parked position because continued turning of the thumb wheel 97 causes a complete closure of the metering valve 96 and pressure is cut off entirely from the wiper system. Immediately upon the closure of the metering valve 96, pressure is cut off from the system and the spring 67 of the parking valve 66 biases the latter to its extremely left hand position to close the line 17 and open the line 18 to the low pressure side. Also, as pressure is cut off from the system, the locking piston 39 is free to move into its locking position under the forces of the spring 44 and the wiper units are thereby locked in this position. As the piston 39 moves into engagement with the piston of the motor to lock the same in its parked position, fluid is displaced in the system, and the displacement thereof is provided for by the parking valve 66 which is conditioned to port the line 18 to the low pressure side.

Under this mode of operation, the wiper blades of the system are automatically moved to a parked position upon the closure of the speed control valve 91, and thereafter they are locked in this position as described for the embodiment illustrated in Fig. 1.

Third embodiment

In this modification of the invention, which is illustrated in Fig. 3, the normal operation again is identical with that described for the embodiment illustrated in Fig. 1. The system is placed in operation by opening the metering valve 105 of the speed control valve 101. The system is brought to rest by closing this valve completely to cut off high pressure fluid to the system. After the valve 105 is closed, the parking valve 66 is moved to its extreme left hand position by the spring 67 and the line 17 is closed. Thereafter, the parking valve 107 is opened by pressing the thumb button 108 which ports high pressure fluid from the pressure inlet opening 103 through the parking outlet opening of the valve (not shown) into the line 21'. Since the line 17 is closed at the control unit 13 by the parking valve 66, admission of high pressure fluid into the line 17 causes the pistons of the motors 22 and 23 to be moved to the extreme right hand position which moves the blades 24 and 25 into their parked position, illustrated in Fig. 1. As pressure is removed from the line 17 by the closing of the parking valve 107, the locking pistons 39 of these motors are moved into locking position to lock the blades in a manner heretofore described.

As embodied in this mode of operation, a system is provided in which the wiper blades are parked semiautomatically after the system has been brought to rest by closing the metering valve 105 and thereafter they are locked in this position mechanically.

In all instances wherein the description dictates, it will be apparent that the notch 46, channeled in the piston 28, may be cut therein at a position suitable to lock the piston of the motor in the extreme right or left hand position, depending upon the placement of the parking line in the system, that is, whether it enters the line 17 or 18, as the case may be.

While specific embodiments of the invention have been illustrated and described, it is apparent that changes could be made therein without departing from the invention in spirit or scope. Accordingly, the representations herein made are to be interpreted as illustrative only and not in a limiting sense, and, insofar as other embodiments fall within the appended claims, they are included as if described.

What is claimed is:

1. In a fluid operated windshield wiper system, a wiper unit having a cylinder and piston therein, a control unit for directing fluid under pressure to said wiper unit, a speed control valve having therein a metering valve and a parking valve, pressure-responsive means within said wiper unit including interengaging means between the piston and the cylinder for positively locking the piston, and means operable in response to fluid pressure in the cylinder to disengage said interengaging means, said speed control valve being operable upon the closure thereof to move the wiping blade of the wiper unit into a parked position automatically in which position said locking means becomes operable to positively lock the wiper blade.

2. In a fluid operated windshield wiper system, a wiper unit having a wiper blade adapted to be reciprocated by a fluid motor, a control unit for directing the flow of operating pressure fluid to said wiper unit whereby the blade thereof is reciprocated, pressure responsive means within said motor for locking it positively in a selected position, including mechanical interengaging means and fluid pressure means operated by fluid pressure applied to the motor to release the interengaging means, a speed control valve having a metering valve and a parking valve therein, said parking valve being adaptable to be opened after the closure of said metering valve to apply operating fluid to said wiper unit whereby the wiper blade is semiautomatically moved to a parked position in which position said locking means becomes operative to positively lock the wiper blade in its parked position.

3. In a fluid operated windshield wiper system having a wiper unit, having a wiper blade, a casing and a piston oppositely movable therein, the combination of a speed control valve and a control unit for directing high pressure fluid to opposite sides of said unit to reciprocate said wiper blade, means within said speed control valve for bypassing fluid into the line feeding one side of said wiper unit, and means within said control unit operated upon a release of pressure into the system to close the line into which the fluid is bypassed.

4. In a fluid operated windshield wiper system having a wiper unit having a wiper blade, a casing and a piston oppositely movable therein, the combination of a speed control valve and a control unit for directing high pressure fluid to opposite sides of said unit to reciprocate said wiper blade, means within said speed control valve for bypassing fluid into the line feeding one side of said wiper unit, means within said control unit operated upon a release of pressure into the system to close the line into which the fluid is bypassed, and pressure responsive means within said wiper unit engageable with a piston therein to lock said piston in a selected position.

5. In a fluid operated windshield wiper system, a wiper unit having a wiper blade adapted to be reciprocated by a fluid operated motor, means for supplying a fluid under pressure to said motor, means for directing the flow of fluid to said motor to cause the wiper blade of said unit to be reciprocated, means for controlling a flow of fluid to said control unit to determine the speed at which said wiper blade is reciprocated, means for injecting fluid under pressure into a line feeding one side of said wiper unit, means within said control unit operable in conjunction with said injecting means to move the wiper blade to a predetermined stopped position, and means within said hydraulic motor automatically operable upon a release of pressure to said system to lock said wiper blade in its stopped position.

6. In a fluid operated windshield wiper system having a wiper unit equipped with a hydraulic motor adapted to reciprocate a wiper blade, means for transmitting a fluid to opposite sides of said hydraulic motor to operate the same, a control unit for directing the flow of fluid to said hydraulic motor, and means within said control unit operable on a release of pressure to close one side of the means directing fluid to one of said motor and to open one of said means supplying fluid to other side of said motor.

7. In a fluid operated windshield wiper system, a first and second windshield wiper unit having a wiper blade adapted to be driven by a first and second fluid operated motor, a control unit for directing the flow of a fluid to said hydraulic motors, a first line for transmitting fluid to the first of said motors and a second line for transmitting fluid to the second of said motors, a line interconnecting said first and second motors, a high pressure line for supplying fluid to said control unit, a speed control valve for controlling a flow of high pressure fluid to said control unit, means interconnecting a parking outlet of said speed control valve with said first line, and means operable within said control unit to close said first line and open said second line to exhaust.

8. In a fluid operated windshield wiper system, a first and second windshield wiper unit having a wiper blade adapted to be driven by a first and second fluid operated motor, a control unit for directing the flow of a fluid to said hydraulic motors, a first line for transmitting fluid to the first of said motors and a second line for transmitting fluid to the second of said motors, a line interconnecting said first and second motors, a high pressure line for supplying fluid to said control unit, a speed control valve for controlling a flow of high pressure fluid to said control unit, means interconnecting a parking outlet of said speed control valve with said first line, means operable within said control unit to close said first line and open said second line to exhaust, and means automatically operable upon the closure of a metering valve of said speed control valve to bypass fluid into said first line to move said wiping blades to a parked position.

9. In a fluid operated windshield wiper system, a first and second windshield wiper unit having a wiper blade adapted to be driven by a first and second fluid operated motor, a control unit for directing the flow of a fluid to said hydraulic motors, a first line for transmitting fluid to the first of said motors and a second line for transmitting fluid to the second of said motors, a line interconnecting said first and second motors, a high pressure line for supplying fluid to said control unit, a speed control valve for controlling a flow of high pressure fluid to said control unit, means interconnecting a parking outlet of said speed control valve with said first line, means operable within said control unit to close said first line and open said second line to exhaust, means automatically operable upon the closure of a metering valve of said speed control valve to bypass fluid into said first line to move said wiping blades to a parked position, and means within said first and second motors to lock said wiper blades in their parked position.

10. In an apparatus of the kind described, a two-way fluid motor, including a housing and a piston operable back and forth therein, control mechanism for reversibly connecting an operating fluid supply connection with opposite sides of the motor, a regulating valve for controlling flow of fluid in the supply connection, whereby to regulate operation of the motor, mechanism to lock the motor in one position including a mechanically interengaging device between the housing and the piston for holding the motor inoperative, and releasing means operated upon opening of the valve for disengaging the interengaging means.

11. In an apparatus of the kind described, a two-way fluid motor, including a housing and a piston operable back and forth therein, control mechanism for reversibly connecting an operating fluid supply connection with opposite sides of the motor, a regulating valve for controlling flow of fluid in the supply connection, whereby to regulate operation of the motor, mechanism to lock the motor in one position including a mechanically interengaging device between the housing and the piston for holding the motor inoperative, and releasing means operated upon opening of the valve for disengaging the interengaging means, said releasing means comprising a pressure-responsive device subjected to operating fluid pressure upon operation of the motor.

12. In an apparatus of the kind described, a two-way fluid motor, including a housing and a piston operable back and forth therein, control mechanism for reversibly connecting an operating fluid supply connection with opposite sides of the motor, a regulating valve for controlling flow of fluid in the supply connection, whereby to regulate operation of the motor, mechanism to lock the motor in one position including a mechanically interengaging device between the housing and the piston for holding the motor inoperative, and releasing means operated upon opening of the valve for disengaging the interengaging means, said valve controlling the fluid supply connection comprising a metering valve adjustable to vary the flow in the connection and to cut said flow off.

13. In an apparatus of the kind described, a two-way fluid motor, including a housing and a piston operable back and forth therein, control mechanism for reversibly connecting an operating fluid supply connection with opposite sides of the motor, a regulating valve for controlling flow of fluid in the supply connection, whereby to regulate operation of the motor, mechanism to lock the motor in one position including a mechanically interengaging device between the housing and the piston for holding the motor inoperative, releasing means operated upon opening of the valve for disengaging the interengaging means, said interengaging device being engageable at one point in the stroke of the piston, means to insure displacement of the piston to such position when the valve is moved to cut off the supply connection, said insuring means including piping between the supply connection and one side of the motor, and means selectively operable to open said piping to connect said side of the motor with the supply connection.

14. In an apparatus of the kind described, a two-way fluid motor, including a housing and a piston operable back and forth therein, control mechanism for reversibly connecting an operating fluid supply connection with opposite sides of the motor, a regulating valve for controlling flow of fluid in the supply connection, whereby to regulate operation of the motor, mechanism to lock the motor in one position including a mechanically interengaging device between the housing and the piston for holding the motor inoperative, releasing means operated upon opening of the valve for disengaging the interengaging means, said control mechanism having fluid pressure operated reversing means subjected to and responsive to fluid pressure on the motor, piping between the operating fluid connection and one side of the motor, and bypass valve means to open said piping and introduce operating pressure to said side of the motor to insure operation of the reversing means to one position, when the regulating valve is cut off.

15. In an apparatus of the kind described, a two-way fluid motor having a housing and an oppositely moving piston therein, a reversing mechanism for reversibly connecting opposite sides of the motor with an operating pressure connection, the reversing mechanism having fluid pressure operated reversing means oppositely connected with opposite sides of the motor, and displaced upon existence of predetermined operating pressure on the motor, a regulating valve controlling fluid flow in the operating pressure connection to the reversing mechanism, bypass piping between one side of the motor and the pressure connection, and bypass valve means controlling said piping, said bypass valve means being operable to effect operating pressure conditions on said one side of the motor and said reversing means to insure operation of the reversing means to an opposite position when the regulating valve is cut off.

16. In an apparatus of the kind described, a two-way fluid motor having a housing and an oppositely moving piston therein, a reversing mechanism for reversibly connecting opposite sides of the motor with an operating pressure connection, the reversing mechanism having fluid pressure operated reversing means oppositely connected with opposite sides of the motor, and displaced upon existence of predetermined operating pressure on the motor, a regulating valve controlling fluid flow in the operating pressure connection to the reversing mechanism, bypass piping between one side of the motor and the pressure connection, bypass valve means controlling said piping, said bypass valve means being operable to effect operating pressure conditions on said one side of the motor and said reversing means to insure operation of the reversing means to an opposite position when the regulating valve is cut off, and means connecting the bypass valve with the regulating valve to open the bypass valve during closing movement of the regulating valve.

17. In an apparatus of the kind described, a two-way fluid motor having a housing and an oppositely moving piston therein, a reversing mechanism for reversibly connecting opposite sides of the motor with an operating pressure connection, the reversing mechanism having fluid pressure operated reversing means oppositely connected with opposite sides of the motor, and displaced upon existence of predetermined operating pressure on the motor, a regulating valve controlling fluid flow in the operating pressure connection to the reversing mechanism, bypass piping between one side of the motor and the pressure connection, bypass valve means controlling said piping, said bypass valve means being operable to effect operating pressure conditions on said one side of the motor and said reversing means to insure operation of the reversing means to an opposite position when the regulating valve is cut off, the bypass piping being connected subsequent to the regulating valve to be controlled thereby, and means interconnecting the bypass valve and the regulating valve for opening of the bypass valve during closing of the regulating valve.

18. In an apparatus of the kind described, a two-way fluid motor having a housing and an oppositely moving piston therein, a reversing mechanism for reversibly connecting opposite sides of the motor with an operating pressure connection, the reversing mechanism having fluid pressure operated reversing means oppositely connected with opposite sides of the motor, and displaced upon existence of predetermined operating pressure on the motor, a regulating valve controlling fluid flow in the operating pressure connection to the reversing mechanism, bypass piping between one side of the motor and the pressure connection, and bypass valve means controlling said piping, said bypass valve means being operable to effect operating pressure conditions on said one side of the motor and said reversing means to insure operation of the reversing means to an opposite position when the regulating valve is cut off, the bypass piping being connected ahead of the regulating valve to be free of control thereby, whereby when the regulating valve is closed and the bypass valve is opened operating pressure will act upon one side of the motor and the reversing means.

19. In an apparatus of the kind described, a two-way fluid motor having a housing and an oppositely moving piston therein, a reversing mechanism for reversibly connecting opposite sides of the motor with an operating pressure connection, the reversing mechanism having fluid pressure operated reversing means oppositely connected with opposite sides of the motor, and displaced upon existence of predetermined operating pressure on the motor, a regulating valve controlling fluid flow in the operating pressure connection to the reversing mechanism, bypass piping between one side of the motor and the pressure connection, bypass valve means controlling said piping, said bypass valve means being operable to effect operating pressure conditions on said one side of the motor and said reversing means to insure operation of the reversing means to an opposite position when the regulating valve is cut off, the bypass piping being connected ahead of the regulating valve to be free of control thereby, whereby when the regulating valve is closed and the bypass valve is opened operating pressure will act upon one side of the motor and the reversing means, and means operable upon closure of the regulating valve to close the side of the motor into which the bypass is connected, from the reversing mechanism.

20. In an apparatus of the kind described, a two-way fluid motor having a housing and an oppositely moving piston therein, a reversing mechanism for reversibly connecting opposite sides of the motor with an operating pressure connection, the reversing mechanism having fluid pressure operated reversing means oppositely connected with opposite sides of the motor, and displaced upon existence of predetermined operating pressure on the motor, a regulating valve controlling fluid flow in the operating pressure connection to the reversing mechanism, bypass piping between one side of the motor and the pressure connection, bypass valve means controlling said piping, said bypass valve means being operable to effect operating pressure conditions on said one side of the motor and said reversing means to insure operation of the reversing means to an opposite position when the regulating valve is cut off, the bypass piping being connected ahead of the regulating valve to be free of control thereby, whereby when the regulating valve is closed and the bypass valve is opened operating pressure will act upon one side of the motor and the reversing means, the bypass valve being selectively operable to open position, and means to reclose the same upon release thereof.

21. In an apparatus of the kind described, a two-way fluid motor having a housing and an oppositely moving piston therein, a reversing mechanism for reversibly connecting opposite sides of the motor with an operating pressure connection, the reversing mechanism having fluid pressure operated reversing means oppositely connected with opposite sides of the motor, and displaced upon existence of predetermined operating pressure on the motor, a regulating valve controlling fluid flow in the operating pressure connection to the reversing mechanism, bypass piping between one side of the motor and the pressure connection, bypass valve means controlling said piping, said bypass valve means being operable to effect operating pressure conditions on said one side of the motor and said reversing means to insure operation of the reversing means to an opposite position when the regulating valve is cut off, the bypass piping being connected ahead of the regulating valve to be free of control thereby, whereby when the regulating valve is closed and the bypass valve is opened operating pressure will act upon one side of the motor and the reversing means, and means operable upon closure of the regulating valve to close the side of the motor into which the bypass is connected, from the reversing mechanism, said closing means having means operated therewith to open the other side of the motor to a source of pressure opposite to that in the operating pressure connection, to permit the motor to move.

22. In an apparatus of the kind described, a two-way fluid motor having a casing and a piston oppositely movable therein, reversing mechanism to deliver fluid under pressure to one side of the motor and to connect the other side to exhaust, and vice versa, a valve controlling flow of fluid to the reversing mechanism, bypass means for selectively connecting high pressure fluid to one side of the motor, and means including a valve operable upon closure of the valve to close the connection from the reversing valve to the said one side of the motor, and to open the connection from said other side of the motor to exhaust.

23. In an apparatus of the kind described, a two-way fluid motor having a casing and a piston oppositely movable therein, reversing mechanism to deliver fluid under pressure to one side of the motor and to connect the other side to exhaust, and vice versa, the reversing mechanism being pressure operated in opposite directions in response to the pressures built up oppositely on the motor, a valve controlling flow of fluid to the reversing mechanism, bypass means for selectively connecting high pressure fluid to one side of the motor, and means including a valve operable upon closure of the valve to close the connection from the reversing valve to the said one side of the motor, and to open the connection from said other side of the motor to exhaust.

RUDOLPH FREEDMAN.
JOHN E. DUBE.

REFERENCES CITED

The following references are of record in the file of this patent:

UNITED STATES PATENTS

| Number | Name | Date |
|---|---|---|
| 1,674,056 | Oishei et al. | June 19, 1928 |
| 1,730,827 | Schilling | Oct. 8, 1929 |
| 2,045,140 | Horton et al. | June 23, 1936 |
| 2,345,433 | Simpson | Mar. 28, 1944 |
| 2,397,599 | Folberth et al. | Apr. 2, 1946 |
| 2,415,607 | Sacchini | Feb. 11, 1947 |
| 2,446,611 | Rose | Aug. 10, 1948 |